United States Patent
Jang et al.

(10) Patent No.: US 11,333,601 B1
(45) Date of Patent: May 17, 2022

(54) THERMO-OPTIC REFRACTOMETRY

(71) Applicant: Government of the United States, as represented by the Secretary of the Air Force, Wright-Patterson AFB, OH (US)

(72) Inventors: Woo Yong Jang, Xenia, OH (US); Nathan E. Zechar, Mason, OH (US); James Park, Fairborn, OH (US); Andrew J. Hamilton, Dayton, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 17/229,897

(22) Filed: Apr. 14, 2021

(51) Int. Cl.
*G01N 21/41* (2006.01)
*G01N 21/43* (2006.01)

(52) U.S. Cl.
CPC ......... *G01N 21/4133* (2013.01); *G01N 21/43* (2013.01); *G01N 2021/414* (2013.01); *G01N 2021/432* (2013.01)

(58) Field of Classification Search
CPC .............. G01N 21/4133; G01N 21/43; G01N 2021/414; G01N 2021/432
See application file for complete search history.

(56) References Cited

U.S. PATENT DOCUMENTS

| 5,165,005 A | * | 11/1992 | Klainer | ............... | G01N 21/431 356/128 |
| 5,659,393 A | * | 8/1997 | Tallone | .................. | G01N 21/45 356/128 |
| 6,970,256 B1 | * | 11/2005 | Jackson | ............. | G01B 11/0625 356/445 |

FOREIGN PATENT DOCUMENTS

EP  3726201 A1 * 10/2020 .......... B01L 3/50273

* cited by examiner

*Primary Examiner* — Hwa Andrew Lee
(74) *Attorney, Agent, or Firm* — AFMCLO/JAZ; Timothy M Barlow

(57) ABSTRACT

A method of determining a refractive index of a material sample comprises removably mounting the material sample into a sample holder having a thermal control mechanism, a thermal expansion compensation mechanism, and a rotation mechanism; projecting a laser beam into the material sample, wherein the material sample has a predetermined orientation and temperature, wherein the material sample has parallel sides defining parallel planes for entry and exit of the laser beam into and out of the material sample; collecting a refracted laser beam from the material sample, and determining the refractive index for the material sample at the predetermined temperature. The laser beam may be a visible laser and/or an infrared laser. The thermal control mechanism comprises a thermal controller coupled to an induction coil apparatus and a temperature sensor. The sample holder comprises a refractory metal consisting of one or more of a niobium/molybdenum alloy and a tantalum/tungsten alloy.

10 Claims, 13 Drawing Sheets

THERMO-OPTIC REFRACTOMETRY

RIGHTS OF THE GOVERNMENT

The invention described herein may be manufactured and used by or for the Government of the United States for all governmental purposes without the payment of any royalty.

FIELD OF THE INVENTION

The present invention relates generally to a method for determining a material's optical properties and, more particularly, to a method for a material's refractive properties as the thermal conditions around the material are varied.

BACKGROUND OF THE INVENTION

Conventionally, the index of refraction is computed by Snell's law which relates the angles of incidence and refraction between two media with different refractive indices. The refractometer is a measuring device based upon Snell's law which calculates the index of refraction of transparent materials. However, the device is limited to measure the refractive index of a sample under relatively low-temperature conditions (<100° C.). The measurement under extreme conditions (over several hundred or even >1000° C.) is still not well-known and there have been little improvements in the characterization tools and measurement techniques incorporating thermal conditions that exceed the current standards.

SUMMARY OF THE INVENTION

The present invention overcomes the foregoing problems and other shortcomings, drawbacks, and challenges in measuring optical properties of materials as the thermal conditions in and around the material change. While the invention will be described in connection with certain embodiments, it will be understood that the invention is not limited to these embodiments. On the contrary, this invention includes all alternatives, modifications, and equivalents as may be included within the spirit and scope of the present invention.

According to one embodiment of the present invention, a method of determining a refractive index of a material sample includes: removably mounting the material sample into a sample holder having a thermal control mechanism, a thermal expansion compensation mechanism, and a rotation mechanism; projecting a laser beam into the material sample, wherein the material sample has a predetermined orientation and temperature, wherein the material sample has parallel sides defining parallel planes for entry and exit of the laser beam into and out of the material sample; collecting a refracted laser beam from the material sample, and determining the refractive index for the material sample at the predetermined temperature. The device permits operation to determine refractive indices for materials heated to over 1000° C., and holds the material sample reliably and securely regardless of thermal expansion of the material sample and the device.

The laser beam may be one or more of a visible laser and an infrared laser. The thermal control mechanism may include a thermal controller coupled to an induction coil apparatus and a temperature sensor. The sample holder may be made from a refractory metal consisting of one or more of a niobium/molybdenum alloy and a tantalum/tungsten alloy. The step of projecting a laser beam into the material sample may include orienting the parallel planes of the material sample to be normal to the laser beam, and projecting the laser beam into the material sample. The method may further include the steps of rotating the material sample in the sample holder to a predetermined angle with regard to the laser beam; heating the material sample to a predetermined temperature; projecting the laser beam into the material sample, and determining the refractive index of the material sample at the predetermined temperature based on the refraction exhibited by the laser beam exiting the material sample.

According to another embodiment of the present invention, an apparatus for determining a refractive index for a material sample includes a laser source; and a sample holder, the sample holder comprising a thermal control mechanism; a thermal expansion compensation mechanism; and a rotation mechanism.

The laser beam may be one or more of a visible laser and an infrared laser. The thermal control mechanism may be a thermal controller coupled to an induction coil apparatus and a temperature sensor. The sample holder may be made from a refractory metal consisting of one or more of a niobium/molybdenum alloy and a tantalum/tungsten alloy.

Each of the features of the method and apparatus may be combined in any manner to achieve the desired results and performance.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
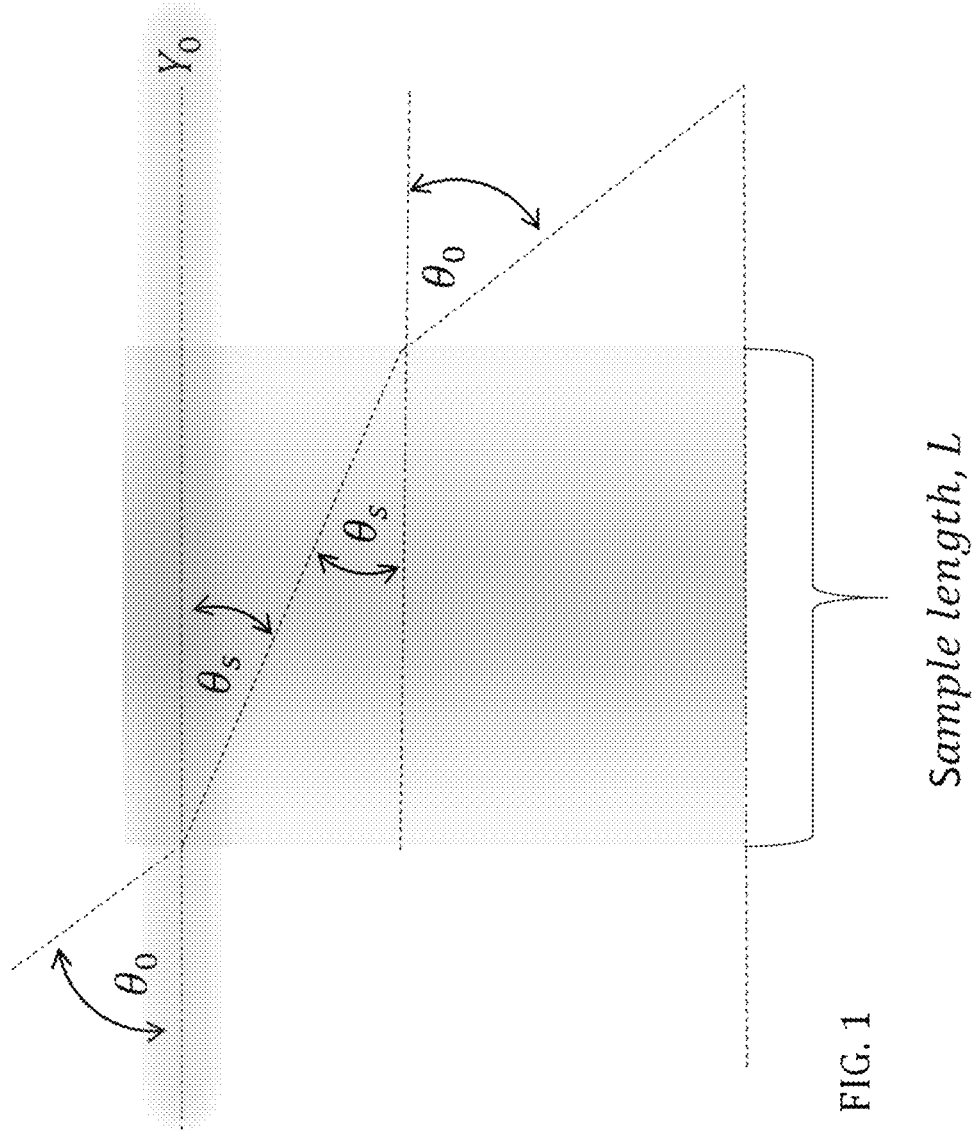
FIG. 1 illustrates wherein the source beam is directly incident to the sample material with a length (L) along with horizontal position $Y_0$, such that when the sample is normal to the laser beam, $\Theta_0$ is zero.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

A novel analytical concept and experimental characterization method for measuring a material's optical properties (refraction and the material's refractive index) as the thermal conditions around the material are varied. The proposed method allows for evaluating the optical quality change and the corresponding impact on sensing performance under various heating conditions. This approach is most relevant for high-temperature transparent ceramic materials that may exhibit a significant change in an index of refraction over the temperature range of interest (i.e., temperature dependency). Such material types have shown an excellent transmission in the EO/IR optical band. With regard to changes in refraction indices, the change in refractive index over temperature is often represented by the "Thermo-Optic Coefficient (dn/dT)". A 'significant' change may be expected when the coefficient, dn/dT, is greater than $6.1 \times 10^{-5}/°$ C. The order of $10^{-5}/°$ C. change in dn/dT is so small and insignificant.

The objective is to provide a method to obtain the refractive index of a material at various temperatures (For example, 30-1500° C.) using optical techniques. The concept of the thermo-optical refractive index is developed from Snell's law to generalize the relationship among the angles of incidence and refraction and the thermo-optical impact in the media or material. Snell's law is reformulated and refined by the introduction of a new term for the temperature-dependent refractive index. The absolute refractive index for a given temperature is calculated as presented below.

The thermo-optical refractometry is originated from the state of the art Snell's law to generalize the relationship among the angles of incidence and refraction as well as taking into account the thermal conditions in the media. By incorporating the temperature effect or coefficients, it is possible to observe and calculate the change of the refractive index for wavelength from the visible (EO) to the IR in a temperature range from 30° C. up to 1500° C. As a result, the sample length and the distance to the detection plane are varied with regard to the temperature change in the material. The angles of incidence and refraction are re-defined where added terms are indicating changes in incidence and refraction due to the temperature change in the material. The corresponding new change in beam position is expected at the detection plane. Hence, the current Snell's law is further extended and re-defined with new terms to solve for the temperature-dependent refractive index under elevated thermal conditions in the material. A novel experimental apparatus is also disclosed to realize the thermo-optical refractometry concept. The apparatus incorporates an induction coil system (heating element), the sample holder, and multiple optical diagnostics which are used to characterize the material as the temperature is varied. To compensate for the thermal effects around the sample, the thermal expansion effect on the material is considered in the design of the heating system and sample fixture.

In particular, the sample fixture comprises a spring-loaded mechanism that provides a secure grip on the sample to provide support while permitting the sample to thermally expand as it is heated by induction coils. Springs handle and compensate the volumetric expansion of a sample under extreme heating conditions from room temperature to over 1000° C. In thermal expansion theory, the volumetric expansion is proportional to the rate of area change per unit change in temperature $$\left(\text{i.e., } a_V = \frac{1}{V}\frac{dV}{dT}\right).$$

The current state-of-the-art measurement apparatus (i.e. the prior art) is a refractometer which is a measuring device based upon Snell's law, and which calculates the index of refraction of transparent materials. Despite a temperature-controlling capability in the refractometer, the device is limited to measuring the refractive index of a sample under relatively low-temperature conditions (i.e. <100° C.). Most standard readings for refractive characteristics have been reported and focused mainly around room temperature or at a relatively low-temperature range between 10° C. and 40° C. On the other hand, the disclosed high-temperature measurement system offers heating capability over 1000° C. through the controlled induction coil system and sample fixture. The system also features independent laser sources (visible and IR) and multispectral (visible/IR) detection capability with independent position-sensing devices. Two independent laser sources may be used, with one operating in visible (EO) and the other in infrared (IR) range, as multi-source targets. These two sources are switchable for operation and measurement purposes and may not be expected to be used simultaneously. Widely used EO/IR sources include Helium-Neon at 632 nm (red) and 543 nm (green) or MWIR QCL laser with a cutoff around 5 μm.

The disclosed invention provides the advantage of performing electromagnetic measurements of high-temperature optically transparent ceramic materials with the analytical methods to extract the index of refraction. Two novel aspects of this invention are the concept of thermo-optic refractometry and the experimental fixture designed to hold and heat the material under test. The concept of the thermo-optical refractive index is developed from Snell's law to generalize the relationship among the angles of incidence and refraction and the thermo-optical impact in the media. By introducing the new term for the temperature-dependent refractive index, Snell's law is reformulated and refined. The experimental fixture incorporates an induction coil, the sample holder, and multiple optical diagnostics used to characterize the material as the temperature is varied.

The proposed system configuration is capable of measuring the refractive index of the material in multiple optical bands, thus enabling multispectral characterization of the material. The induction heater system is applied around the sample fixture and provides heating from room temperature to more than 1000° C. The induction heater is designed to perform targeted heating concentrated around the sample region with a highly uniform temperature. Induction coils are spaced around the sample fixture, particularly focused on where the sample is mounted. Such induction coils induce time-varying e-fields upon the fixture as the coils are excited with their time-varying e-field. The induced currents by the induction coils ohmically heat the sample fixture, raising the temperature of the fixture environment. The heat from the sample fixture will transfer to the sample inside of it via conduction. Our results showed that the induction heating system provides highly uniform heating of materials, e.g. optical materials, with a diameter of 1" (25.4 mm) or smaller and a thickness of 5.0 mm or less. Size is an important consideration because if the sample is too large, we start experiencing a thermal gradient on a heated surface and at extreme temperatures (≥1000° C.). Such gradient changes may induce sample cracks or damage due to the thermal mismatch.

The spatial arrangement of the induction coils as well as the excitation frequency and power to them, produces even heating to the sample placed at the center of the fixture. Our testing shows uniform heating with only ±5° C. uncertainty or variation. However, there may be room to improve the coil design.

The sample holder is made from a metal alloy which has high thermal conductivity such that the sample can be heated by the conduction in the holder. The sample fixture may be fabricated of refractory metals with excellent thermal properties, an extremely high melting point, e.g above 2000° C., and good thermal conductivity. Suitable refractory metals include niobium/molybdenum and tantalum/tungsten. Refractory metals are stable against deformation when they are exposed to very high temperatures. As described above, thermal expansion is considered in the design of the sample holder and fixture for the extreme heating condition from room temperature to over 1000° C.

Thermo-optic refractometry provides a novel characterization method for measuring high-temperature, optically transparent ceramic materials' properties as the thermal conditions around the material are varied. This approach provides a solution to the problem of performing electromagnetic measurements to obtain the refractive index of an optically transparent ceramic material at varying temperatures (For example, 30-1500° C.). This invention provides repeatable and accurate results and supports the material science and electromagnetic fields.

This invention provides the advantage of performing electromagnetic measurements of high-temperature optically-transparent ceramic materials with the analytical methods to extract the index of refraction. Two of the new aspects of this invention are the concept of thermo-optic refractometry and the experimental fixture designed to hold and heat the material being tested for characterization.

Suppose that an optical beam is focused along a horizontal axis and interacts with a boundary which contracts and expands linearly. The thermally-dependent index of refraction of a material may be extracted by making use of several known and measured dimensions and angles. The relationship between incidence and refraction angles is established when the beam travels through a boundary between two different media then exits from a material (e.g., air-to-material then material-to-air). Starting from the classic Snell's law, this is simply expressed by the ratio of the sines of incident and refraction angles, which is inversely equal to the ratio of the indices of refraction for air and the material, respectively. The incident angle of the source beam is defined as first positioned normal to the material under test, and measurements are taken at two different positions after the beam exits the sample.

To achieve and measure the angle of incidence, the source beam must first be directly incident (see FIG. 12) to the sample material along the horizontal position. This ensures that when the sample surface is normal to the laser beam (FIG. 12), the incident angle is zero so that the beam propagates straight through the sample and is projected to the same location without any refractive effects. When the beam propagates at a zero incidence angle (i.e., propagates normal to the sample surface), the angle of the incident beam is equal to the exit (angle) in which no refraction is seen. Thus there is no beam shift in the projecting plane (just straight through the center of the sample). Both surfaces of the sample S must be parallel to each other so that incident and exit planes are matched. This ensures Snell's law holds so that the incident angle is identical for both the beam entering and the beam exiting the material sample S.

Figure 8:
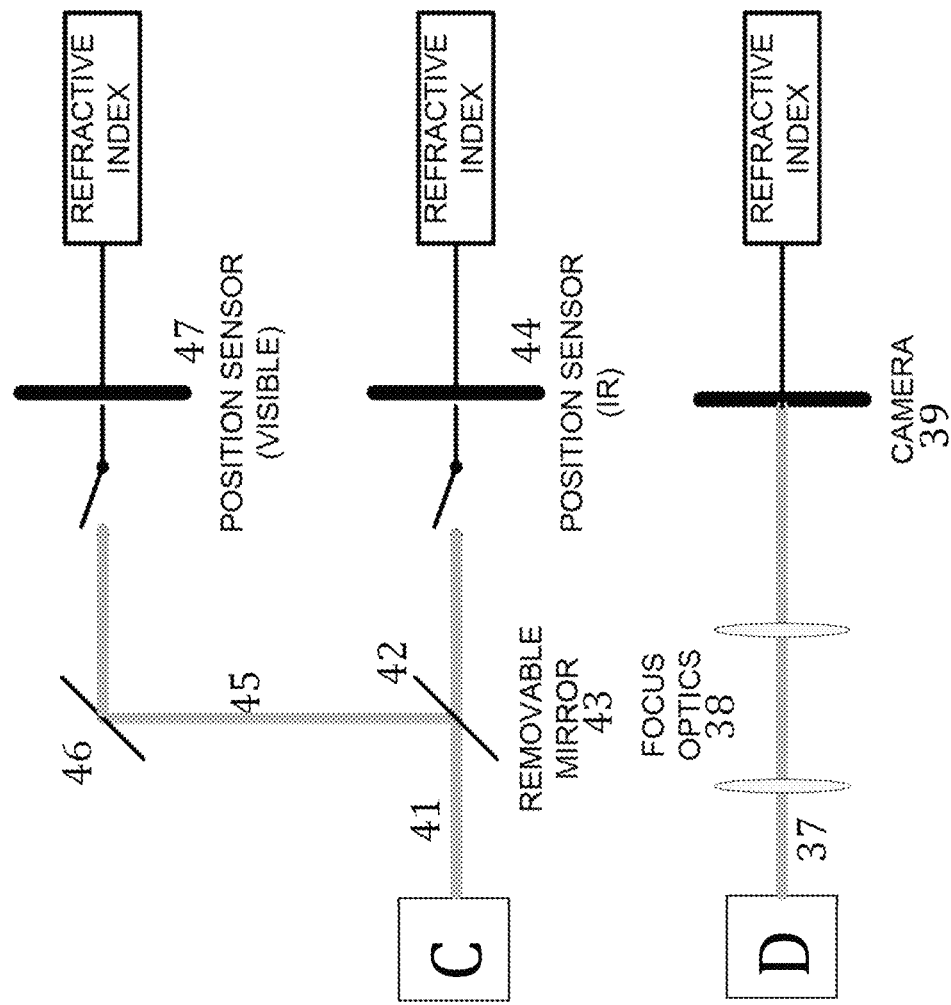

The incident angle of the source beam may then be varied, and measurements are repeated. This is achieved as the sample or beam is rotated (see FIG. 13) and the lateral position of the exiting beam is measured after the beam exits the sample and is projected onto the detection plane. The sample rotation controls the angle of incidence. Once the sample rotates, the beam is refracted and projected with a vertical shift. The term "vertical" simply corresponds to the vertical beam position as the beam is refracted out through the sample. Such vertical position is measured in terms of the distance between the sample and the detector. Change in vertical beam position is recorded by the position-sensing device (see FIGS. 5 and 8). The distance between the sample and the detector is measured. The refraction angle is computed and the corresponding index of refraction for the material is obtained by solving Snell's law with known parameters for the refractive index of air and angles of incidence and refraction. Hence we can solve for the refraction angle and the corresponding index with respect to position, length, and distance. This solution represents the index of refraction for the material at room temperature. Next, we may extend the method to solve for the temperature-dependent refractive index under elevated thermal conditions in the material. Having considered the thermal expansion effect on the material, the sample length, and the distance to the detector are varied with respect to the defined temperature change in the material. Then the angles of incidence and refraction are re-defined where added terms indicate changes in incidence and refraction due to the temperature change in the material. Two added terms are the changes in incidence and refractive angles as a result of changes in sample length and distance to the detector because of the heated sample material. For a temperature change, the new change in the lateral beam position is measured by the position-sensing detector. By incorporating new temperature-dependent terms into Snell's law, the corresponding index of refraction of the material at an elevated temperature is obtained. The change in the refraction index of the material due to the elevated temperature is then computed by observing the difference between indices at room temperature and elevated temperature.

A new high-temperature measurement system and configuration are presented for supporting thermo-optical refractometry. The system consists of two independent laser sources (visible and IR), an induction heating system, and two independent position-sensing detectors (operating in visible and IR). The proposed system measures the refractive index of the material in multiple optical bands, enabling multispectral characterization of the material. For high-temperature material characterization capability, the induction coil system may be tailored to produce even heating upon the sample fixture. The fixture then transfers heat to the sample, mainly through conduction at lower temperatures. At much higher temperatures, radiative heating will also transfer to the sample. The induction heater system is applied around the sample fixture and provides heating from room temperature to over 1000° C. The induction heater consists of circular magnetic coils based on Helmholtz configuration which heat an electrically-conducting metal holder by electromagnetic induction. The heat created by the induction heater is inside the metal sample fixture itself, and does not require an external heat source. The induction heater is arranged to provide targeted heating concentrated around the sample region with a highly uniform temperature.

The heat generated by the metal holder is then transferred to the material sample and heats the material sample rapidly and uniformly over the entire sample surface. The sample holder is made from a metal alloy which has high thermal conductivity such that the material sample, i.e. window or window material, can be heated by the conduction in the holder. Among metals acceptable for the sample holder are refractory metals, which feature excellent thermal properties, e.g. an extremely high melting point (above 2000° C.) and good thermal conductivity. Common elements for refractory metals include niobium/molybdenum and tantalum/tungsten. Refractory metals are stable against deformation when exposed to very high temperatures. Technically, any highly conductive metal is acceptable, but refractory metals will be needed for higher temperature applications. Thermal expansion is considered and compensated in the design. A spring-loaded mechanism provides a secure grip on the material sample (i.e. window) to provide support and yield as the sample thermally expands under the extreme heating from room temperature to the final temperature, which may be over 1000° C.

For beam propagation, the optical configuration includes a beam expander followed by collimating and focusing optics. A beam is directed through the heated material sample. The position sensor projects the transmitted beam and records the lateral beam shift. The measured lateral shift is then inserted into the formula for computing the refraction angle and corresponding index of a material.

The angles of incidence and refraction are calculated and re-calculated according to changes in incidence and refraction due to the temperature change in the material. By introducing the re-calculated terms to Snell's law, the refractive index of material under elevated thermal conditions may be obtained.

As mentioned above, thermal expansion of the material is considered and compensated in this method and device. The fixture incorporates an induction coil, the adjustable, flexible sample holder, and multiple optical diagnostics, i.e. characterization hardware, which are used to measure the thermos-optical properties of a material, and to characterize the material as the temperature is varied. A closed-loop temperature control system may be used in the induction heating mechanism. In addition, there may be a fluid flow with cooling fluid circulation (not shown) inside the tube of induction coil windings. For high-precision temperature calibration and measurements around the heated sample, three different methods are used together: one is the use of thermocouple, made of a nickel-, platinum-, or tungsten-alloy, to allow the thermocouple (probe) to be used beyond several hundred degrees or even a thousand degrees Celsius. The second is the use of an optical spectrometer with fiber optics to collect emitted light and record its spectrum. The use of a CCD spectrometer is an alternative method to probe the surface temperature of a heated sample, i.e. instead of or in addition to the depicted thermocouple 54. The fiber-based CCD spectrometer can measure the emission or radiation from the heated sample surface (NOT the transmitted source beam) and record its spectrum from visible to near IR range. The CCD spectrometer operates from visible to near IR (200 nm-1 μm).

The temperature value is then extracted by matching the recorded spectrum into the calibrated corresponding blackbody spectrum. Temperature of the heated sample is NOT determined by the transmitted source beam (i.e., the refracted light beam). Instead, the thermocouple or spectrometer directly looks at the heated sample surface to measure the temperature. Another approach to characterize the surface temperature of the material sample is to incorporate the IR camera (not shown). The IR camera is the third method to measure the temperature of a heated sample surface. This may be instead of or in addition to thermocouple 54. The IR camera operates in the mid-wave (3-5 μm) or long-wave (8-12 μm) IR range. The calibration of the object temperature is based upon the total or aggregated radiation from the heated material sample considering the object's absorption, reflection, and transmission. For materials being tested, we may focus on investigating the thermo-optical characteristics of high-temperature transparent ceramics. These materials have shown excellent transmission in the optical band, i.e. transmission spectrum, with a superior cutoff at least by 1 micron or higher. For detection of thermal conditions in or on the material sample, the measurement system may comprise independent laser sources (e.g. operating in visible and IR), an induction heating system, and two position-sensing devices (in visible and IR); the beam(s) propagate through the heated sample and are then projected onto the detection plane of the position-sensing devices 44, 47. The two laser sources are switchable for operation and measurement purposes and are not typically expected to be used simultaneously. For measurement, the position sensor 44, 47 projects the beam(s), and the change in lateral beam position or the lateral beam shift due to the heated material sample is recorded. It measures the position of the refracted beam and also determines the change in lateral beam position as a result of the thermally heated material sample (also including the thermal expansion effect). The measured lateral shift is then inserted into the calculation for determining the refraction angle and corresponding refractive index of the material. The IR photodetector is also used as a position-sensing device to probe the change in intensity (in volts) due to the thermo-optical beam shift. An example of a position sensing device in IR is the quadrant cell photoreceiver which is widely used for highly sensitive beam position measurement, e.g. the position-sensing devices available at https://www.thorlabs.com.

In the alternative, optical interferometry may be accomplished with an induction heating system to measure the index of refraction of materials at various temperatures. The interferometer is utilized to measure the index of refraction by comparing the optical path lengths of the beam. This is achieved by projecting the interference patterns of a beam and comparing them. In our characterization system, the interference pattern is created at the beam combiner 36. The interference pattern is then focused and imaged at the CCD 39. The interferometer system is indicated in 39 of FIG. 5. Starting with the source at 12, the laser beam propagates through the "circuit" until reaching the beam splitter 26. Here the laser source enters the beam splitter 26 and two coherent sources propagate away from the splitter. One of these propagates through the material sample (probing beam 27) and one follows a reference path 28. The probing beam 27 and the reference beam 28 are recombined at beam combiner 36. The interference pattern is created here, the combined beam 37 is focused and the result is measured by the CCD at 39.

The following examples illustrate the particular properties and advantages of some of the embodiments of the present invention. Furthermore, these are examples of reduction to practice of the present invention and confirmation that the principles described in the present invention are therefore valid but should not be construed as in any way limiting the scope of the invention.

For beam propagation in the proposed configuration (see FIGS. 5-8), the optical path will begin at one or more laser sources 12, 14 and undergo beam expansion 22, collimation 24, and focusing 24. One of the lasers 12 may emit a visible beam 13, and the other laser 14 may emit an infrared (IR) beam 15. Each beam is directed, e.g. by mirrors 16 to a removable mirror 20 from which a beam 21 is directed into beam expander 22 and collimator/focus optics 24. After beam expansion, collimation, and focus, the beam 21 is directed into a beam splitter 26.

The beam splitter 26 splits the beam 21 into a probing beam 27 and a reference beam 29. The reference beam 29 is routed with one or more mirrors 28 around the material sample being tested in the alloy fixture 50 while the probing beam 27 is propagated through the material sample. A refracted beam 30 exits the sample material and is directed with one or more mirrors 32, 36, 40 toward position sensors 44, 47 and an optical camera 39. The material sample in the alloy fixture 50 is heated with an induction coil heater 28, positioned with a rotation mechanism 52, and the temperature of the material sample is measured with a thermocouple 54.

The reference beam 29 and refracted beam 30 may be recombined at beam combiner 36 to form recombined beam 37. The recombined beam 37 is directed through focus optics and sent to an optical camera for analysis of an interference pattern. A variety of interference patterns are collected, e.g. without a sample material in the fixture 50, with the sample material at room temperature, and with material materials at various elevated temperatures. Analysis of these interference patterns provides the necessary information to directly calculate the index of refraction of the material.

The refracted beam 30 may also be directed (via various mirrors 40, 42, 46) toward a visible light position detector 47 and an infrared light position detector 44. One or more of the mirrors may be used to divide the position sensor beam 41 into an IR position sensor beam 43 and a visible position sensor beam 45 for delivery to the respective position sensors 44, 47.

Figure 9:
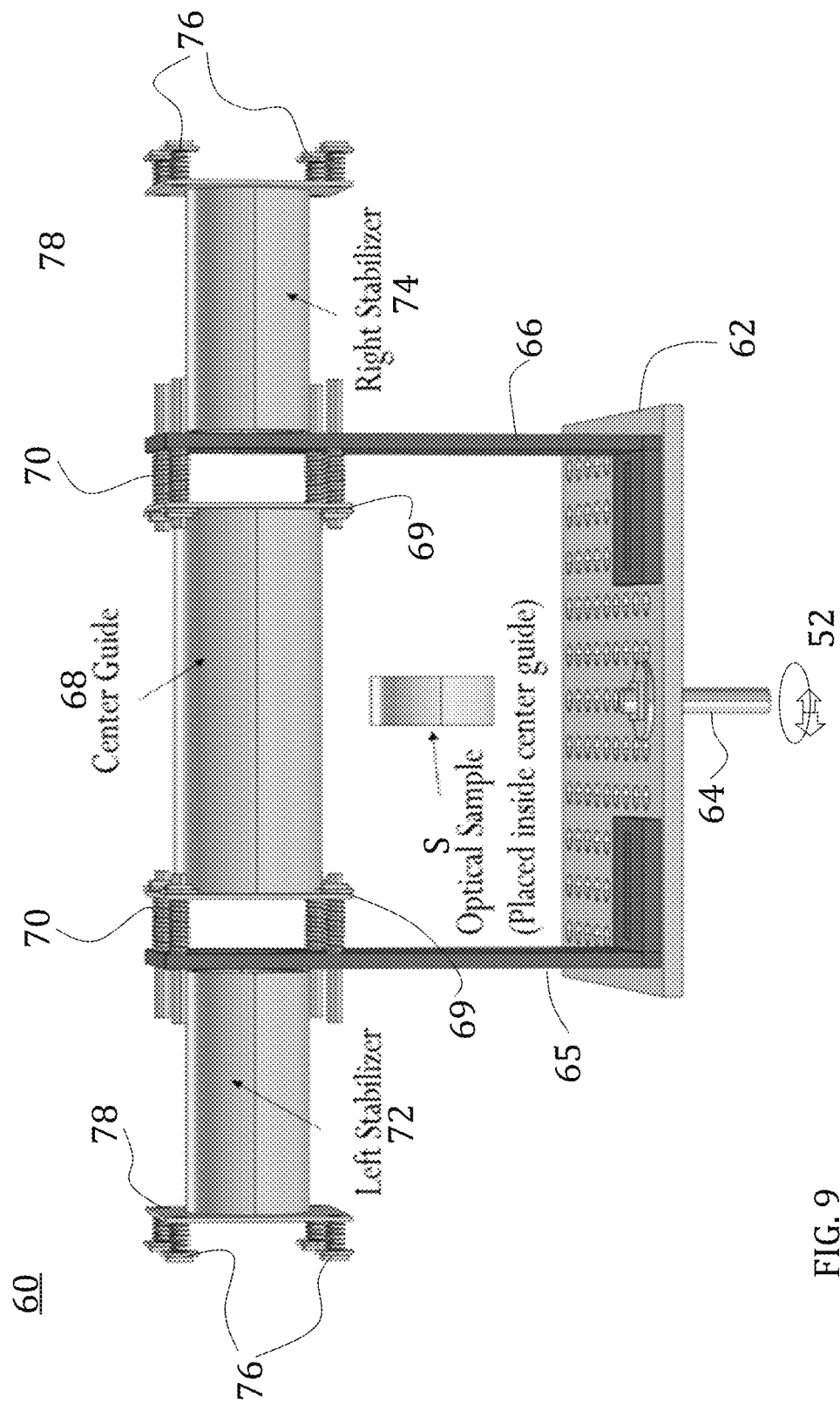
FIGS. 9-11 illustrate an apparatus for high-temperature refraction determinations.
Figure 10:
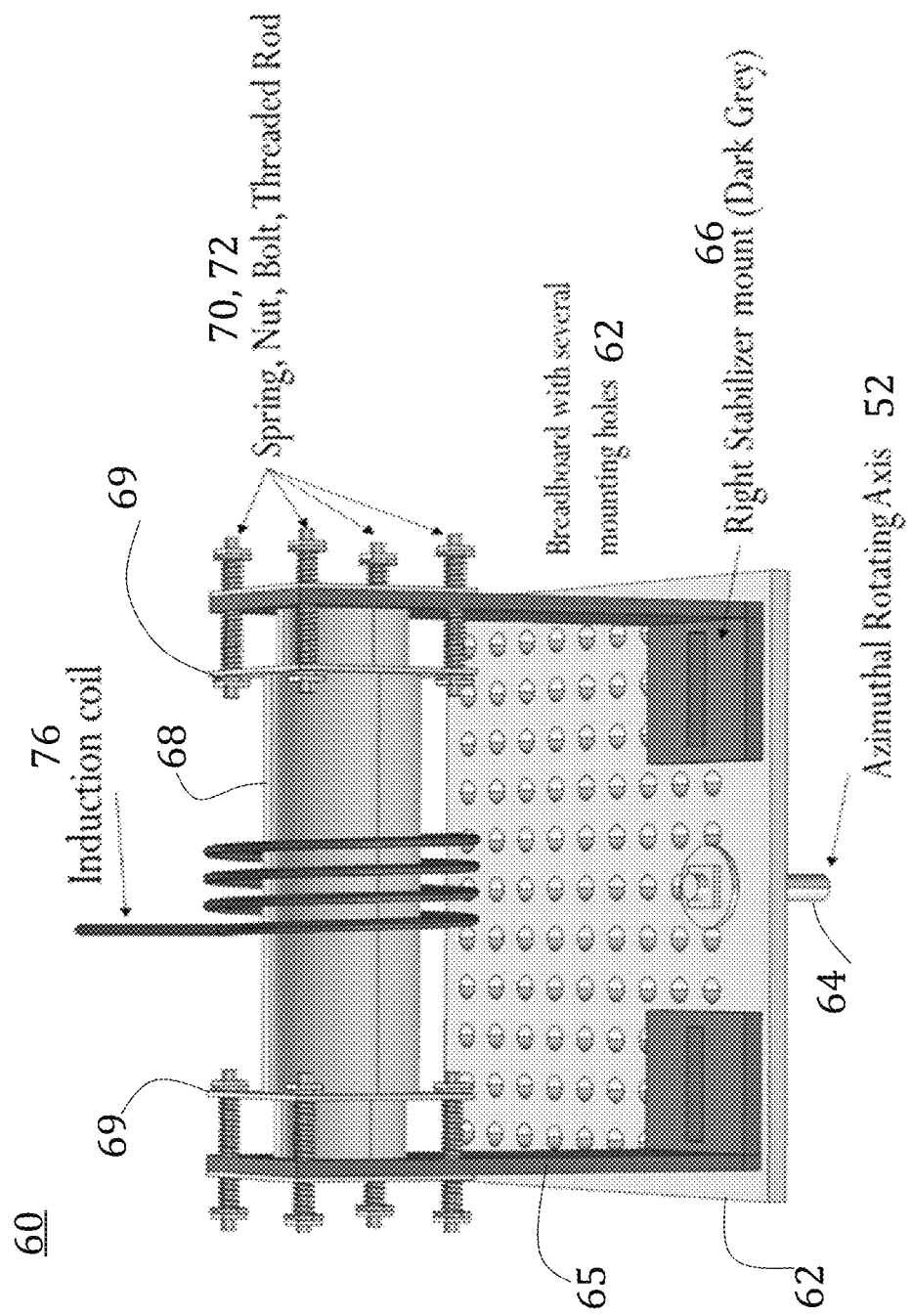
Figure 11:
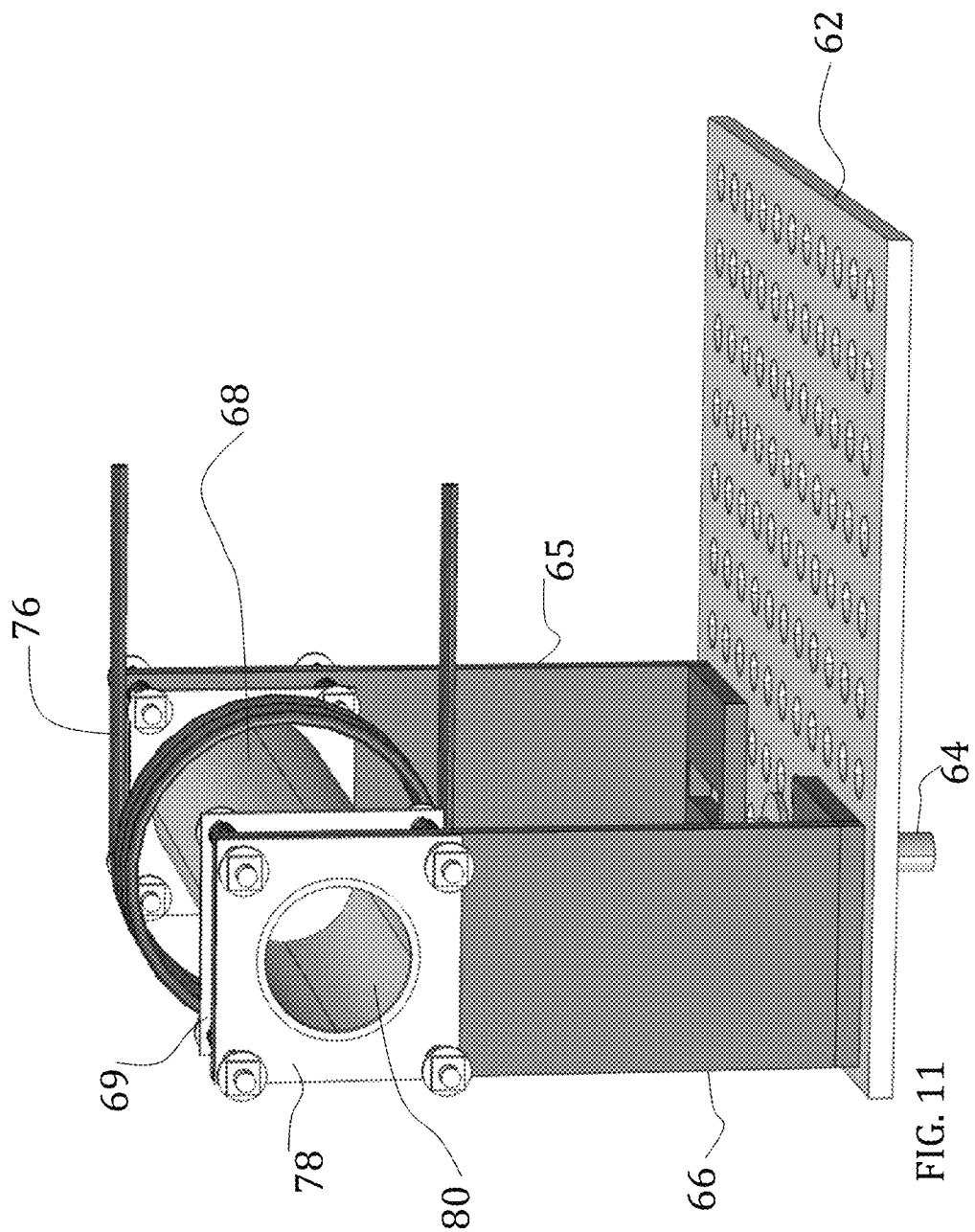

For detection of the change in lateral beam position or the lateral beam shift as the source beam transits through the heated material sample, another alternative for the position sensor is to utilize a silicon photodiode-based lateral sensor to measure the displacement of an incident beam relative to the calibrated center. This is intended to measuring the movement of a beam, the distance traveled, or as feedback for alignment systems. This sensor is a possible alternative to position sensors 44, 47. FIGS. 9-11 illustrate one embodiment of the disclosed apparatus for flexibly holding a material sample.

Figure 4:
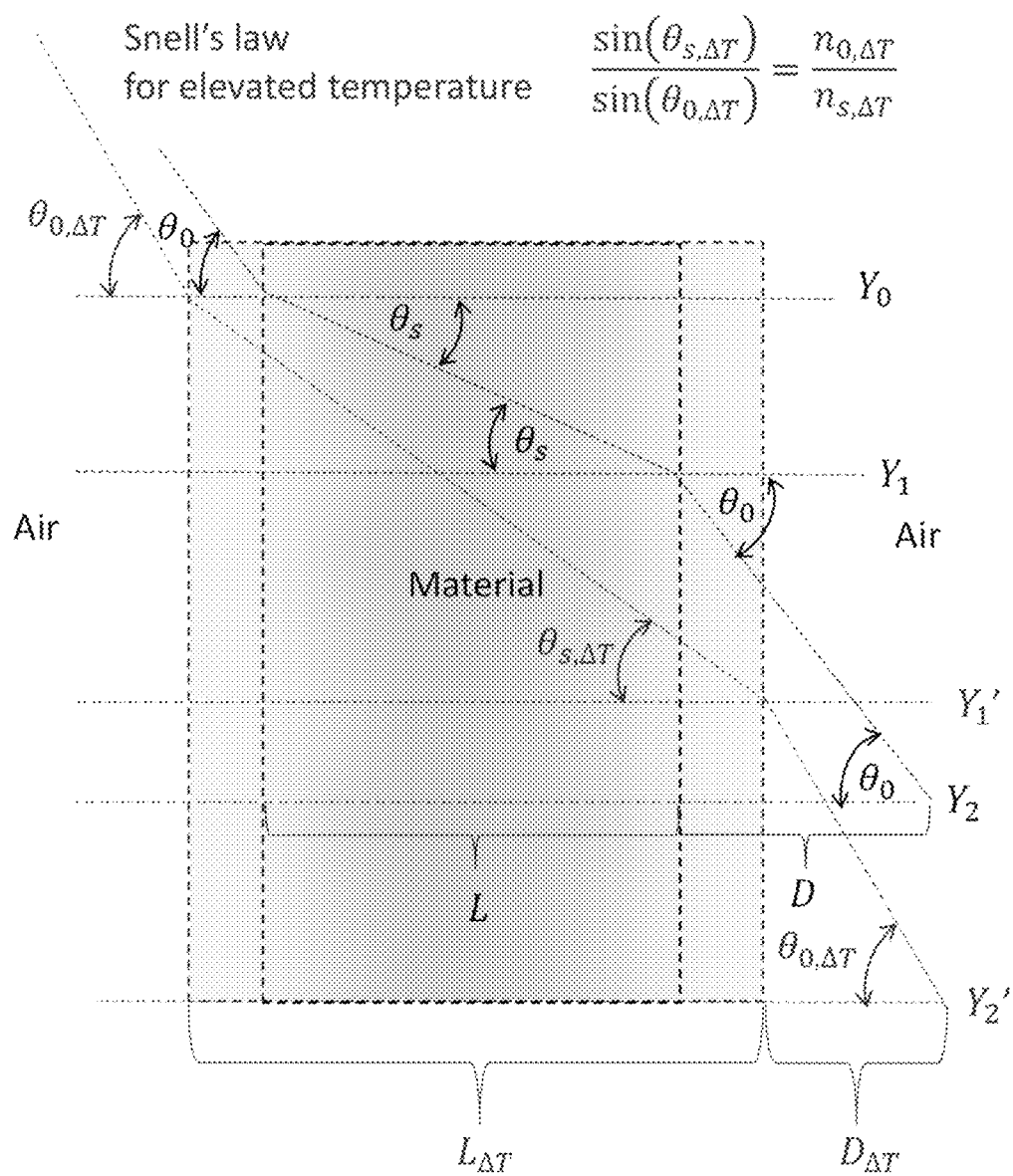
FIG. 4 illustrates solving for the temperature-dependent refractive index under elevated thermal conditions in the material.

Suppose that an optical beam is focused along a horizontal axis of the material sample S (see FIG. 12) and interacts with a boundary (i.e. sample length or thickness, see FIGS. 1, 4, 12) which contracts and expands linearly. In this case, the thermally dependent index of refraction of a material can be extracted by making use of several known and measured dimensions and angles. The relationship between incidence and refraction angles is established when the beam travels through a boundary between two different media then exits from a material (i.e., air-to-material then material-to-air). Starting from the classic Snell's law, this is simply expressed by the ratio of the sines of incident $\Theta_0$ and refraction $\Theta_s$ angles (see FIG. 1), which is inversely equal to the ratio of the indices of refraction $n_0$ and $n_s$ for air and material respectively.

$$\frac{\sin(\theta_s)}{\sin(\theta_0)} = \frac{n_0}{n_s}$$

To achieve and measure the incident angle $\Theta_0$, the source beam is directly incident to the sample material with a length of L along with the horizontal position $Y_0$. This ensures that when the sample is normal to the laser beam, the $\Theta_0$ is zero so that the beam propagates straight through the sample and is projected to the same location. See FIGS. 1 and 12. It is important that the sides of the material sample S through which the beam enters and exits the material sample S are parallel. The calculations will not work without parallel sides.

Figure 2:
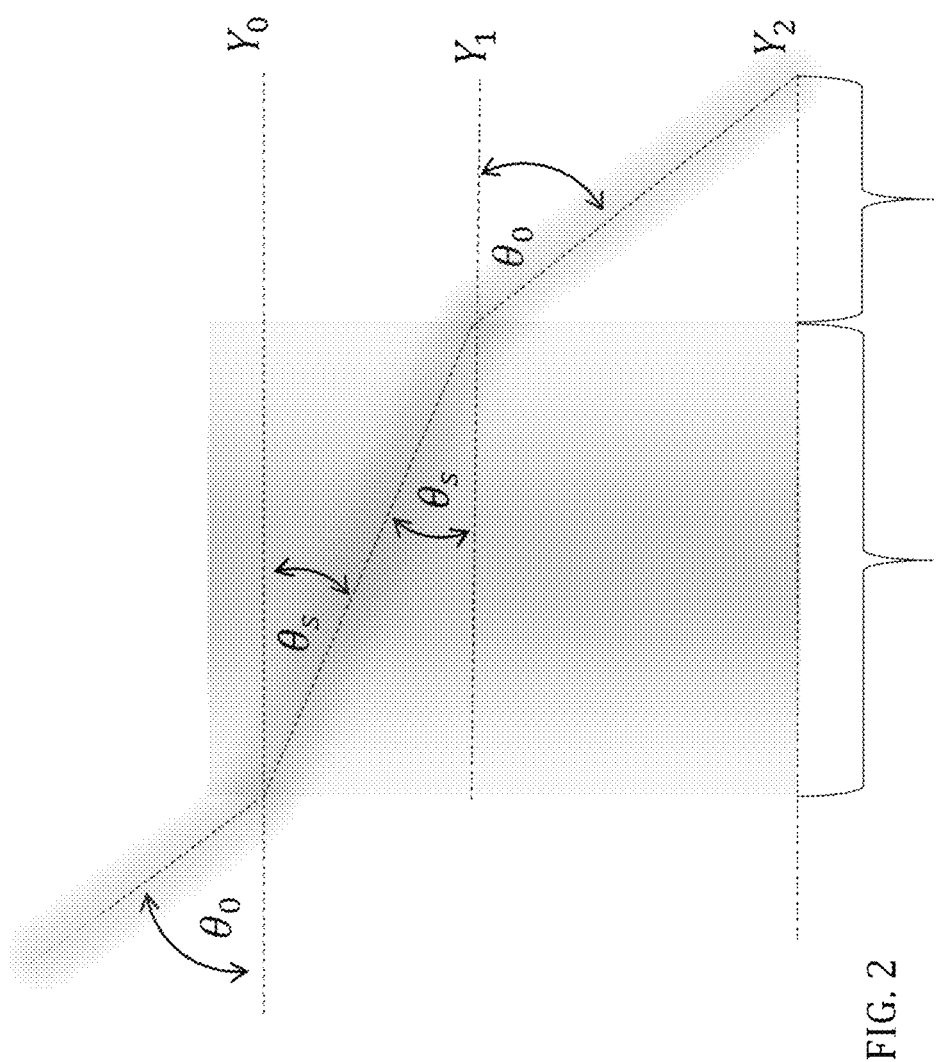
FIG. 2 illustrates wherein the beam is rotated by $\Theta_0$ and the lateral position $Y_2$ is measured after the beam exits the sample and is projected onto a detection plane.

Next, the beam is rotated by $\Theta_0$ and the lateral position $Y_2$ is measured after the beam exits the sample and is projected onto the detection plane (see FIG. 2). The sample rotation controls the angle of incidence $\Theta_0$. Once the sample rotates with $\Theta_0 > 0$, the beam is refracted and projected with a vertical shift. Change in vertical beam position $Y_2$ is recorded by the position-sensing device. The distance D between the sample and the detector is measured. The position $Y_1$ is unknown and defined in between $Y_0$ and $Y_2$ where the beam exits from material to air (See FIG. 2).

Figure 3:
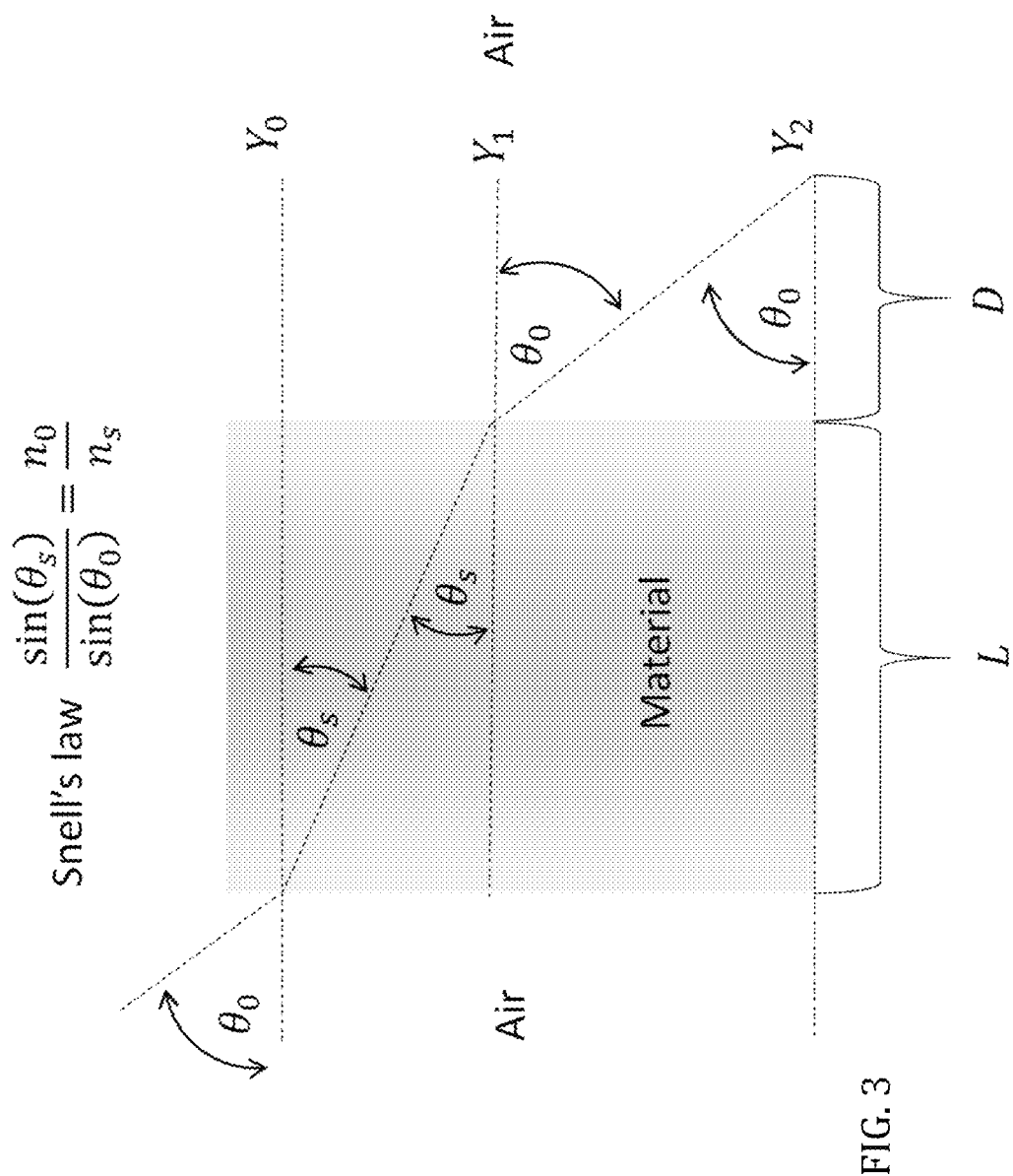
FIG. 3 illustrates solving for the refraction angle $\Theta_s$ for a material at room temperature, and the corresponding index $n_s$ with respect to positions, length, and distance.

Since Snell's law holds for the beam propagation from air to material and out to air, we can solve for the refraction angle $\Theta_s$ and the corresponding index $n_s$ w.r.t. positions, length, and distance. See FIG. 3.

Using trigonometry, the tangent functions of $\Theta_0$ and $\Theta_s$ are found, $\tan(\theta_0) = (Y_1 - Y_2)/D$ and $\tan(\theta_s) = (Y_0 - Y_1)/L$.

Both expressions are then re-arranged for $Y_1$, $Y_1 = D \cdot \tan(\theta_0) + Y_2$ and $Y_1 = Y_0 - L \cdot \tan(\theta_s)$.

Now we can find the tangent function of $\Theta_s$ by eliminating the unknown $Y_1$ as below, $$Y_1 = D \cdot \tan(\theta_0) + Y_2 \text{ and } Y_1 = Y_0 - L \cdot \tan(\theta_s)$$
$$\Downarrow \qquad\qquad \Downarrow$$
$$D \cdot \tan(\theta_0) + Y_2 = Y_0 - L \cdot \tan(\theta_s)$$
$$\Downarrow$$
$$\tan(\theta_s) = \frac{Y_0 - Y_2 - D\tan\theta_0}{L}.$$

By taking the inverse tangent, the refraction angle $\Theta_s$ is computed and the corresponding index of refraction $n_s$ for the material is obtained by solving Snell's law with known parameters $n_0$ air), angles $\Theta_0$ and $\Theta_s$, $$\theta_s = \tan^{-1}\left(\frac{Y_0 - Y_2 - D\tan\theta_0}{L}\right)$$
$$\Downarrow$$

-continued $$\theta_s = \tan^{-1}\left(\frac{Y - D\tan\theta_0}{L}\right)$$

where the difference $Y$ is $Y_0 - Y_2$.

⇩

$$n_s = n_0\sin(\theta_0)/\sin(\theta_s) = n_0\sin(\theta_0)\bigg/\sin\!\left(\tan^{-1}\!\left(\frac{Y - D\tan\theta_0}{L}\right)\right).$$

This is the solution for the index of refraction $\Theta_s$ for the material at room temperature. Now we extend the method to solve for the temperature-dependent refractive index under elevated thermal conditions in the material (See FIG. 4).

For the thermal condition, the thermal expansion effect on the material is considered. As a result, the sample length L and the distance to detector D are varied w.r.t. the temperature change ($\Delta T$) in the material defined as $$L_{\Delta T} = L + \Delta L \text{ and } D_{\Delta T} = D - \Delta L.$$

Then the angles of incidence and refraction are re-defined as $$\theta_{0,\Delta T} = \theta_0 + \Delta\theta_0 \text{ and } \theta_{s,\Delta T} = \theta_s + \Delta\theta_s,$$

where $\Delta\Theta_0$ and $\Delta\Theta_s$ are added terms indicating changes in incidence and refraction due to the temperature change $\Delta T$ in the material. For $\Delta T$, the new change in lateral beam position $Y_2'$ is measured by the position-sensing detector. With the sample length $L_{\Delta T}$ and the distance $D_{\Delta T}$, the new tangent functions of $\theta_{0,\Delta T}$ and $\theta_{s,\Delta T}$ are found, $$\tan(\theta_{0,\Delta T}) = (Y_1' - Y_2')/D_{\Delta T} \text{ and } \tan(\theta_{s,\Delta T}) = (Y_0 - Y_1')/L_{\Delta T}.$$

By re-arranging tangent functions, we obtain the expressions for the unknown $Y_1'$, $$Y_1' = D_{\Delta T}\tan(\theta_{0,\Delta T}) + Y_2' \text{ and } Y_1' = Y_0 - L_{\Delta T}\tan(\theta_{s,\Delta T}).$$

Then by eliminating $Y_1'$, we can solve for the angle of refraction $\theta_{s,\Delta T}$ w.r.t. the change in temperature $\Delta T$ as follows, $$Y_1' = D_{\Delta T} \cdot \tan(\theta_{0,\Delta T}) + Y_2' \text{ and } Y_1' = Y_0 - L_{\Delta T} \cdot \tan(\theta_{s,\Delta T})$$

⇩

$$D_{\Delta T} \cdot \tan(\theta_{0,\Delta T}) + Y_2' = Y_0 - L_{\Delta T} \cdot \tan(\theta_{s,\Delta T})$$

⇩

$$\tan(\theta_{s,\Delta T}) = \frac{Y_0 - Y_2' - D_{\Delta T} \cdot \tan(\theta_{0,\Delta T})}{L_{\Delta T}}$$

⇩

$$\theta_{s,\Delta T} = \tan^{-1}\!\left(\frac{Y_0 - Y_2' - D_{\Delta T} \cdot \tan(\theta_{0,\Delta T})}{L_{\Delta T}}\right)$$

⇩

$$\theta_{s,\Delta T} = \tan^{-1}\!\left(\frac{Y' - D_{\Delta T} \cdot \tan(\theta_{0,\Delta T})}{L_{\Delta T}}\right),$$

where $Y' = Y_0 - Y_2'$ and $L_{\Delta T}$, $D_{\Delta T}$, $\theta_{0,\Delta T}$ can be measured, then $\theta_{s,\Delta T}$ can be found.

By incorporating the $\theta_{s,\Delta T}$ into the Snell's law, the corresponding index of refraction of the material for elevated $\Delta T$ is obtained by $$n_{s,\Delta T} = n_{0,\Delta T}\sin(\theta_{0,\Delta T})/\sin(\theta_{0,\Delta T}) =$$

$$n_{0,\Delta T}\sin(\theta_{0,\Delta T})\bigg/\sin\!\left(\tan^{-1}\!\left(\frac{Y' - D_{\Delta T} \cdot \tan(\theta_{0,\Delta T})}{L_{\Delta T}}\right)\right).$$

The change in refraction index $\Delta n$ of the material due to elevated temperature $\Delta T$ is then computed by taking a difference between $n_s$ at room temperature and $n_{s,\Delta T}$ at elevated temperature, $$\Delta n = n_{s,\Delta T} - n_s =$$

$$\left[\frac{n_{0,\Delta T}\sin(\theta_{0,\Delta T})}{\sin\!\left(\tan^{-1}\!\left(\frac{Y' - D_{\Delta T} \cdot \tan(\theta_{0,\Delta T})}{L_{\Delta T}}\right)\right)} - \frac{n_0\sin(\theta_0)}{\sin\!\left(\tan^{-1}\!\left(\frac{Y - D\tan(\theta_0)}{L}\right)\right)}\right].$$

Apparatus Design: The high-temperature measurement system may include two independent laser sources (visible and IR), an induction heating system, two position-sensing devices (visible and IR), an interferometer. For high-temperature material characterization capability, the induction coil system is designed and manufactured for heating small optical materials. The diagram below shows multi-characterization methods to measure the refractive index of the material and the proposed optical configuration in the system maintains the beam intensity of at least 50%. Our proposed analytical concept indicates that the computation of the refractive index is independent of beam intensity.

| Item | Alignment order |
|---|---|
| Laser (<5 mw/visible/IR) | (1) |
| Beam Expander | (2) |
| Collimator/Focusing lens | (3) |
| Beam splitter | (4) |
| Sample/Fixture/Induction heater | (5) |
| Linear stage with stepper motor | (5) |
| Thermocouple/IR camera | (5) |
| Photodetector/Position-sensing device | (6) |
| Beam combine | (7) |
| Interferometer | (8) |

FIGS. 9-11 illustrate one embodiment of the disclosed apparatus for flexibly holding a material sample. The proposed characterization setup consists of two independent laser sources one operating in visible and the other beam in mid-wave infrared (MWIR) range (see FIG. 5). These two sources are switchable for operation purposes and are not expected to be used simultaneously. Widely used visible/infrared sources are Helium-Neon at 632 nm (red) and 543 nm (green) or MWIR QCL laser with a cutoff around 5 μm. For beam propagation, the optical configuration consists of a beam expander followed by collimating and focusing optics. A beam splitter is used to produce a reference beam, which passes around the material sample, and a probe beam to transmit through the sample. For detection, three independent systems are used: the visible and IR position sensors, and interferometry.

As illustrated in FIGS. 9-11, the sample holder 60 for the window optic S is made from a metal alloy which has high thermal conductivity such that the window can be heated by the conduction in the holder. Also, thermal expansion is considered in the design. A support base 62 is supported on a rotation shaft 64 for controllable rotation about a rotation axis 52. A pair of support brackets 65, 66 are attached to the support base 62. A center guide 68 is hollow and includes a flange 69 on each end for ease in flexibly securing the center guide 68 to the support brackets 65, 66. The flanges 69 are flexibly attached to the support brackets 65, 66 with a plurality of threaded fasteners 70, e.g. screws, and springs. A left stabilizer 72 has a flange 78 on its outer end, and the left stabilizer 72 is slid into the center guide 68 and secured to the fasteners 70 with complementary fasteners 76, e.g. nuts and springs. A similar right stabilizer 74 is removably attached to the center guide 68 in a manner identical to that of the left stabilizer 72. The left stabilizer 72 and right stabilizer 74 extend into a cavity 80 (see FIG. 10) in the center guide 68 toward each other in a manner to trap and support the window sample S, i.e. material sample, optical sample.

FIGS. 10-11 depict an induction coil 76 around the center guide 68. A cavity 80 in the center guide 68 is visible.

The spring-loaded mechanism described above provides a secure grip on the window sample S to provide support while the sample thermally expands. The holder 60 has adjustable left and right stabilizers 72, 74 that allow fitment of a variety of windows S having a range of different widths and diameters. Springs handle the volumetric expansion of the sample S under the extreme heating condition from room temperature to over 1000° C. In thermal expansion theory, the volumetric expansion is proportional to the rate of area change per unit change in temperature.

The induction heater system 34, 76 is applied around the center guide 68 and may consist of circular magnetic coils based on Helmholtz configuration which heat an electrically conducting metal holder, i.e. center guide 68, left and right stabilizers 72, 74, by electromagnetic induction. The rapidly alternating magnetic field penetrates the metal object, generating electric currents inside the conductive metal holder. The highlight of the induction heater is that the heat is created inside the metal fixture itself, instead of by an external heat source. Accordingly, the induction heater is designed to perform targeted heating that is concentrated around the sample region with a highly uniform temperature. The heat generated in the metal holder is then transferred to the window S and heats rapidly and uniformly over the entire surface of the window S. Key parameters for induction coil design are the number of coils, spacing, the separation between holder and coil to achieve power efficiency, and uniform heating while avoiding any thermal gradient. A closed-loop temperature control system 54 is used with the induction heating mechanism. In addition, there is a fluid flow with cooling fluid circulation inside the tube of induction coil windings.

Restated, at the ends of the center guide 68 are holes which allow for rods 70 having threaded ends to travel through them. The rods 70 attach the centerpiece 68 to the left and right support brackets 65, 66 and left and right stabilizers 72, 74 by nuts, bolts, and springs. The stabilizers 72, 74 are slightly smaller in outside diameter than the inner diameter of the center guide 68, which allows them to slide into the center guide 68. These parts are then held in place by the support brackets 65, 66 which are attached to a support base 62, e.g. an optical breadboard. Together, these parts comprise a spring-loaded system which may be used to hold an optical sample S in place while it is heated. The system allows for thermal expansion to take place while securing the optical sample S at a precise location with regard to the azimuthal rotation. The system is shown fully assembled in FIG. 10.

Figure 5:
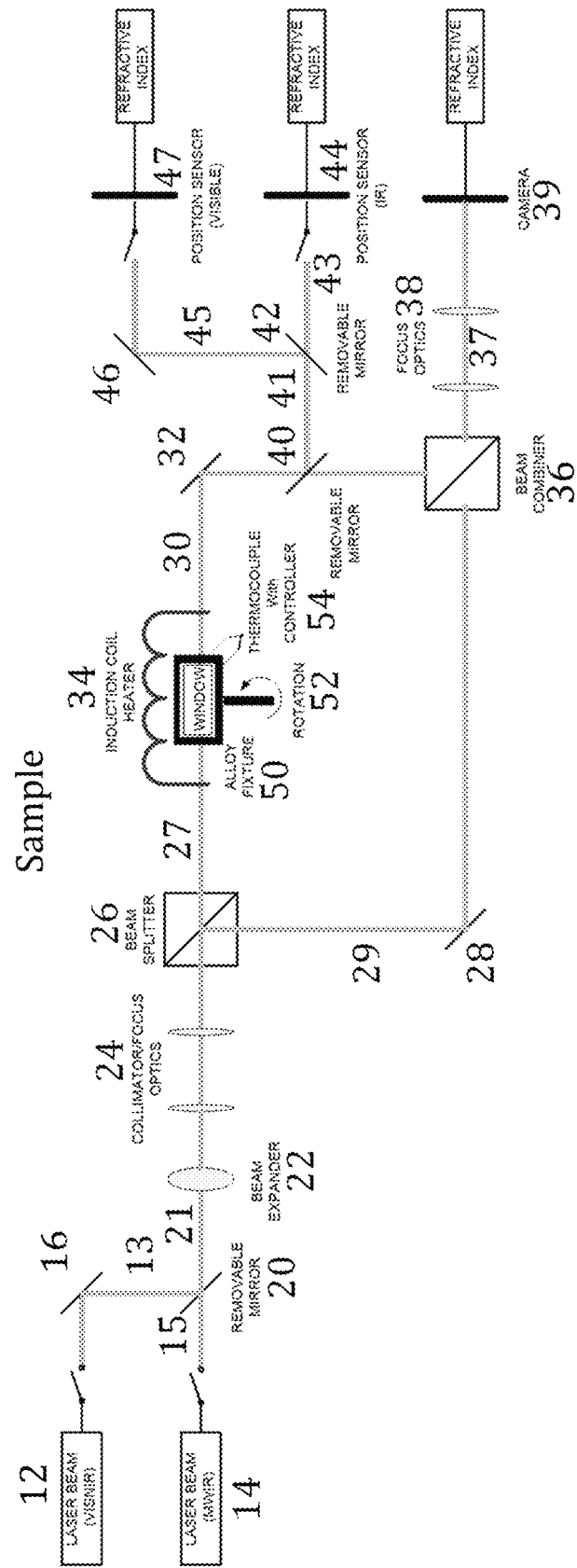
FIGS. 5-8 illustrate an apparatus for high-temperature refraction determinations.
Figure 6:
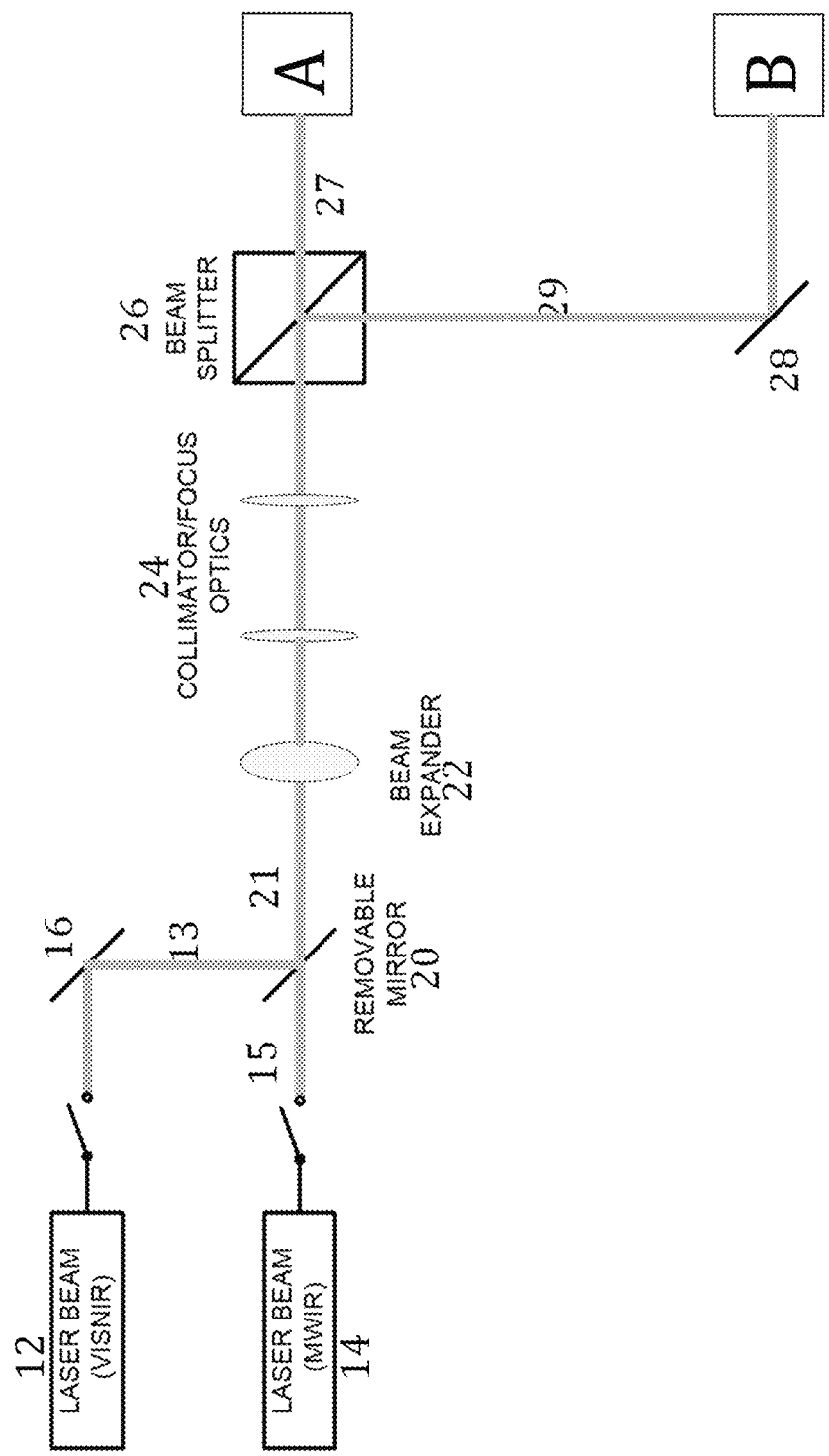
Figure 7:
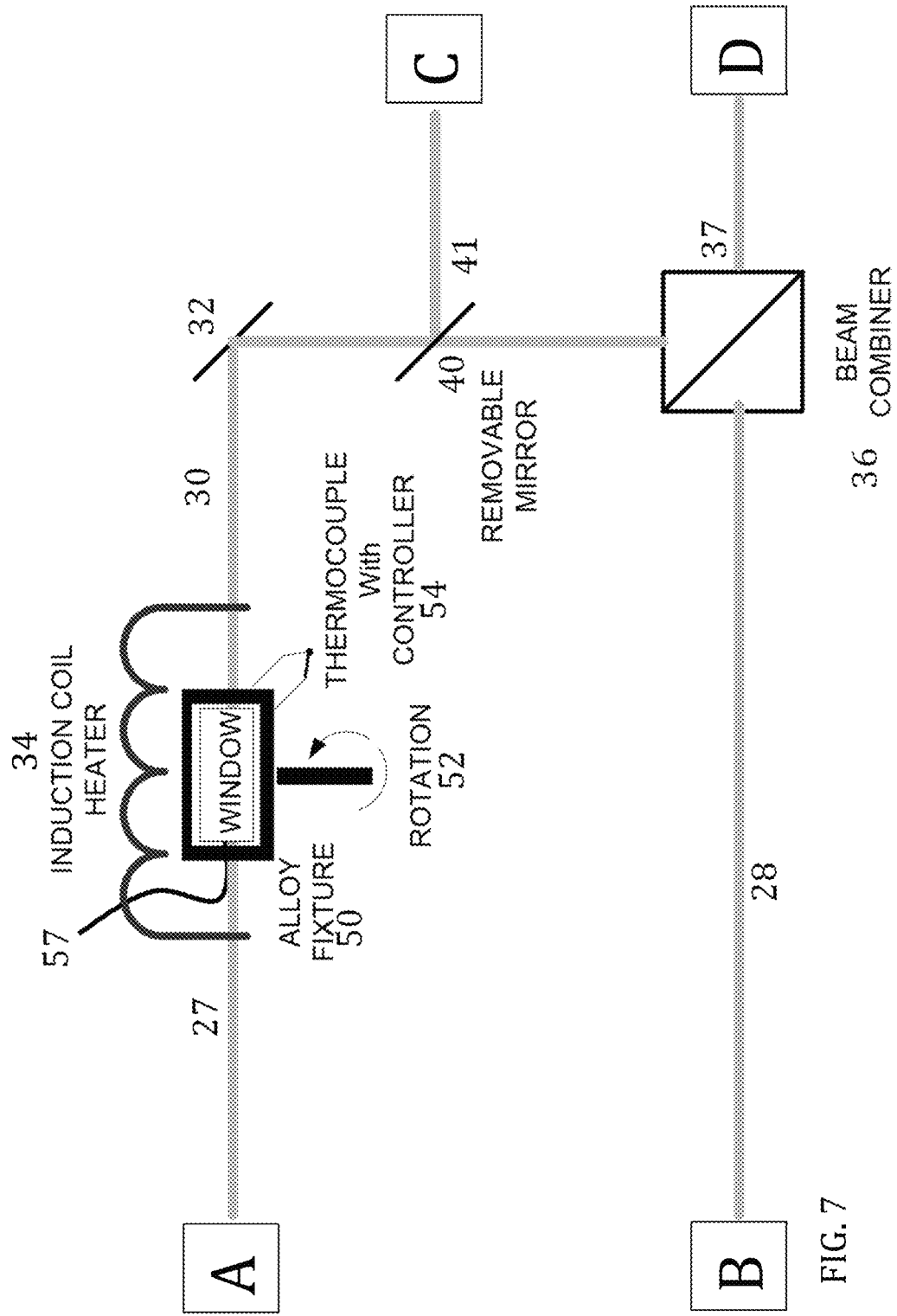

An induction coil 76 is placed around the center guide 68 before positioning the left and right stabilizers 72, 74 inside the center guide 68. Support base 62 provides a stable mounting plane for the stabilizers 72, 74, and is also used to firmly secure the induction coils 76 so that the entire assembly 60 may rotate around the azimuthal rotating axis 52 as shown in FIGS. 5 and 9. Once induction heating begins, thermal expansion will take place upon the optical sample S, center guide 68, and stabilizers 72, 74. The spring-loaded system will then gently adjust for the thermal expansion and prevent cracking and misalignment of the sample due to thermal stresses.

For high-temperature calibration and measurements around the heated sample, three different methods may be used: one is the use of thermocouple typically made by Ni-alloy or Pt- or Tungsten-alloy to be able to probe beyond several hundred or even a thousand degrees Celsius. The other method is to use an optical spectrometer with fiber optics to collect emitted light and record its spectrum. The temperature value is then extracted by matching the recorded spectrum into the calibrated corresponding blackbody spectrum. An alternative approach to characterize the surface temperature is to incorporate the IR camera. The calibration of the object temperature is based upon the total or aggregated radiation from the camera considering the object's absorption, reflection, and transmission.

The third measurement will use optical interferometry to measure the index of refraction of materials at various temperatures. The optical path will begin at the laser(s) 12, 14 and undergo beam expansion, collimation, and focusing (see FIGS. 5-6). The beam is then split into an optical and a reference beam. The reference beam is routed around the material sample S while the probing beam propagates through the material sample S (see FIGS. 5 and 7). These beams are recombined to create an interference pattern on an optical camera (see FIGS. 5 and 8). Interference patterns are collected without a material, with the material at room temperature and with materials at various temperatures. Analysis of these interference patterns provides the necessary information to directly calculate the index of refraction of the material sample S.

For materials under test, we focus on investigating thermo-optical characteristics of high-temperature transparent ceramics. These window materials had shown an excellent transmission in the optical band with a superior cutoff at least by 1 micron or higher. For detection and measurement, the three independent detection systems are utilized. The position sensor projects the beam in the visible and records the lateral beam shift. The measured lateral shift is then inserted into the proposed theory for computing the refraction angle and corresponding index of a material. Also, the IR photodetector (or position sensor) is used to probe the change in intensity (in volts) due to the thermo-optical beam shift. An example of a position sensing device is the quadrant cell photoreceiver which is widely used for highly sensitive beam position measurement. The quad detector consists of four identical photocells located adjacent to each other. Photocurrents from four photocells are processed to perform vertical difference and horizontal difference or even making a sum among quadrants. Another alternative for the position sensor is to utilize a silicon photodiode-based lateral sensor to measure the displacement of an incident beam relative to the calibrated center. This is intended to measuring the movement of a beam, the distance traveled, or as feedback for alignment systems. Finally, the interferometer is utilized to measure the index of refraction by comparing the optical path lengths of the beam. This is done by projecting the interference patterns of a beam and comparing them.

In our characterization system, an interference pattern is transmitted after the beam is recombined, and then the recombined beam is collected on a camera.

Figure 12:
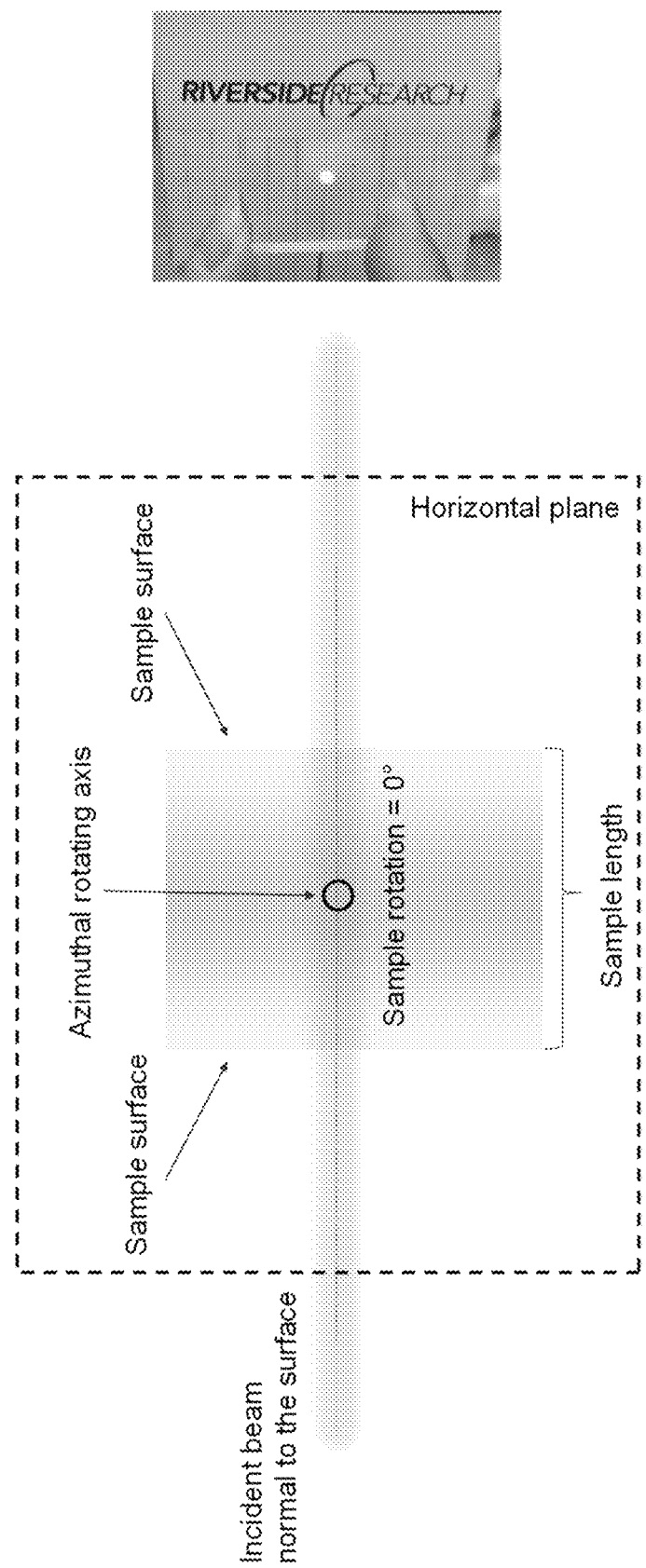
FIGS. 12-13 present refraction through a normal and rotated material sample.
Figure 13:
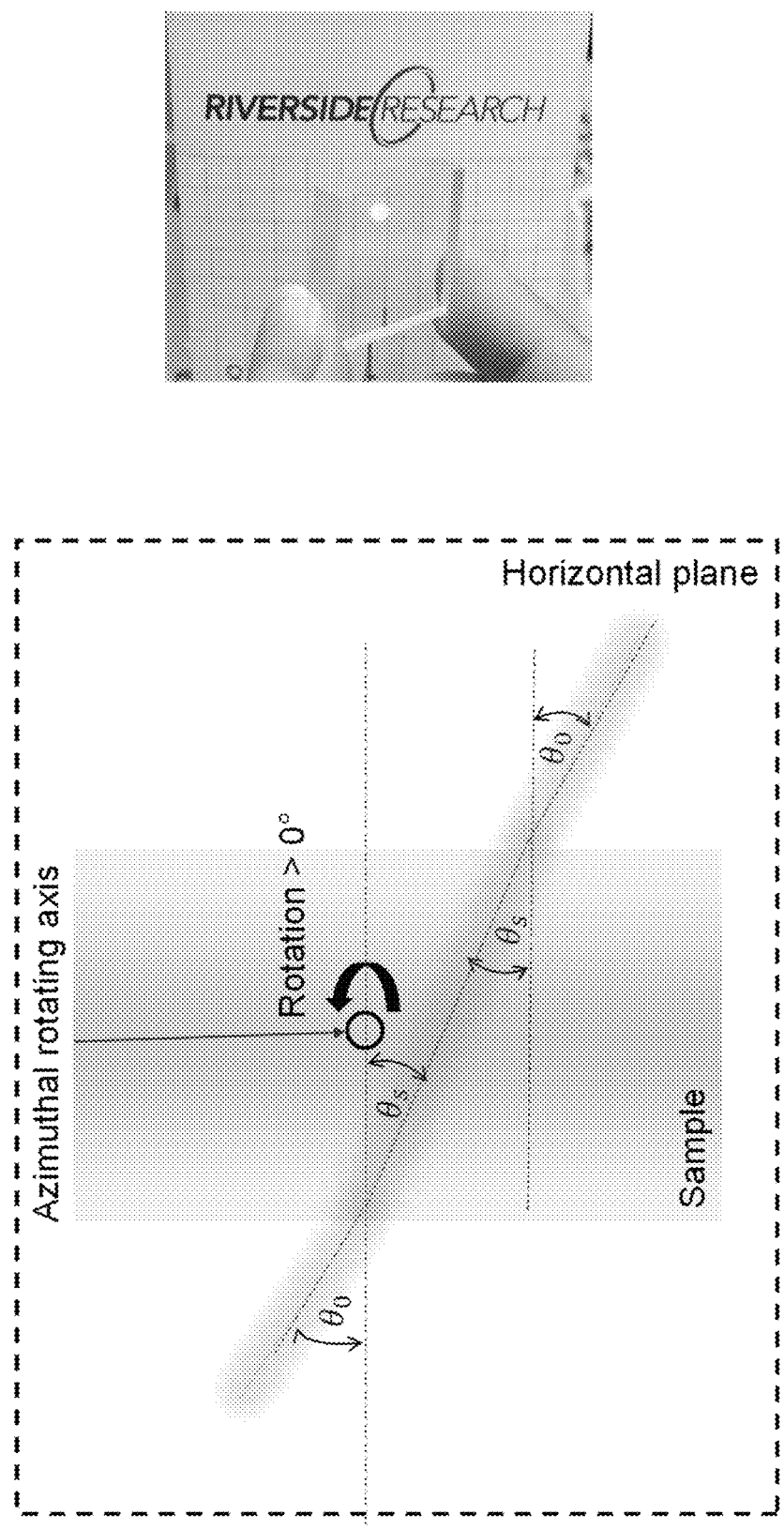

FIGS. 12-13 present refraction through a rotated material sample. FIG. 12 presents a diagram illustrating the "normal" or "direct" incidence of the beam with regard to the surface of sample S. The beam (light) entering the sample S is perpendicular to its surface. The vertical and horizontal axes of the sample are indicated in FIG. 12. In normal incidence, the source beam is directly incident to the sample along the horizontal axis so that the incident angle is zero, which also means the rotation angle of the sample S is zero. As a result, the beam propagates straight through the sample S and is projected to the same location without any refractive effects, as depicted in the photo on the right.

After establishing the direct or normal incidence angle, the incident angle of the source beam is then varied (i.e. the incident angle is no longer normal to the sample surface) by rotating the sample as indicated in FIG. 13 and the lateral position of the exiting beam is no longer with respect to the horizontal plane. As presented in FIGS. 7, 10, and 13, the sample is rotated azimuthally about the vertical axis and as a result, the beam is shifted with respect to the horizontal plane. As the sample rotates about the azimuthally vertical axis, the projected beam will no longer be displaced. Hence, the beam will start to shift with respect to the horizontal plane. After the beam exits the sample S, the refracted beam is projected onto the detection plane with a beam shift from the center, as depicted in the photo on the right.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of determining a refractive index of a material sample, comprising:
   removably mounting the material sample into a sample holder having a thermal control mechanism, a thermal expansion compensation mechanism, and a rotation mechanism;
   projecting a laser beam into the material sample, wherein the material sample has a predetermined orientation and temperature, wherein the material sample has parallel sides defining parallel planes for entry and exit of the laser beam into and out of the material sample;
   collecting a refracted laser beam from the material sample; and
      determining the refractive index for the material sample at the predetermined temperature, wherein the rotation mechanism comprises a rotation shaft,
   wherein the thermal expansion compensation mechanism comprises
   a support base supported on the rotation shaft for controllable rotation about a rotation axis;
   a pair of support brackets attached to the support base;
   a hollow center guide including a flange on each end for flexibly securing the center guide to the support brackets, wherein the flanges are flexibly attached to the support brackets with a plurality of threaded fasteners and springs;
   a left stabilizer having a flange on its outer end, the left stabilizer extending into the center guide and secured to the fasteners with complementary fasteners and springs;
   a right stabilizer having a flange on its outer end, the right stabilizer extending into the center guide and secured to the fasteners with complementary fasteners and springs in a manner identical to that of the left stabilizer, the left stabilizer and right stabilizer extending into a cavity in the center guide toward each other in a manner to trap and support the material sample.

2. The method of claim 1, wherein the laser beam is one or more of a visible laser and an infrared laser.

3. The method of claim 1, wherein the thermal control mechanism comprises a thermal controller coupled to an induction coil apparatus and a temperature sensor.

4. The method of claim 1, wherein the sample holder comprises a refractory metal consisting of one or more of a niobium/molybdenum alloy and a tantalum/tungsten alloy.

5. The method of claim 1, wherein the step of projecting a laser beam into the material sample comprises
   orienting the parallel planes of the material sample to be normal to the laser beam; and
   projecting the laser beam into the material sample.

6. The method of claim 1, further comprising: rotating the material sample in the sample holder to a predetermined angle with regard to the laser beam; heating the material sample to a predetermined temperature; projecting the laser beam into the material sample; and determining the refractive index of the material sample at the predetermined temperature based on the refraction exhibited by the laser beam exiting the material sample.

7. An apparatus for determining a refractive index for a material sample, comprising:
   a laser source; and
   a sample holder, the sample holder comprising
      a thermal control mechanism;
      a thermal expansion compensation mechanism; and
      a rotation mechanism comprising a rotation shaft,
      wherein the thermal expansion compensation mechanism comprises
      a support base supported on the rotation shaft for controllable rotation about a rotation axis;
      a pair of support brackets attached to the support base;
      a hollow center guide including a flange on each end for flexibly securing the center guide to the support brackets, wherein the flanges are flexibly attached to the support brackets with a plurality of threaded fasteners and springs;
      a left stabilizer having a flange on its outer end, the left stabilizer extending into the center guide and secured to the fasteners with complementary fasteners and springs;
      a right stabilizer having a flange on its outer end, the right stabilizer extending into the center guide and secured to the fasteners with complementary fasteners and springs in a manner identical to that of the left stabilizer, the left stabilizer and right stabilizer extending into a cavity in the center guide toward each other in a manner to trap and support the material sample.

8. The apparatus for determining a refractive index for a material sample of claim 7, wherein the laser beam is one or more of a visible laser and an infrared laser.

9. The apparatus for determining a refractive index for a material sample of claim 8, wherein the thermal control mechanism comprises a thermal controller coupled to an induction coil apparatus and a temperature sensor.

10. The apparatus for determining a refractive index for a material sample of claim 8, wherein the sample holder comprises a refractory metal consisting of one or more of a niobium/molybdenum alloy and a tantalum/tungsten alloy.

* * * * *